United States Patent
Kern et al.

(10) Patent No.: US 8,037,364 B2
(45) Date of Patent: Oct. 11, 2011

(54) FORCED MANAGEMENT MODULE FAILOVER BY BMC IMPEACHMENT CONSENSUS

(75) Inventors: Eric Richard Kern, Chapel Hill, NC (US); William Gabriel Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 12/351,078

(22) Filed: Jan. 9, 2009

(65) Prior Publication Data

US 2010/0180161 A1  Jul. 15, 2010

(51) Int. Cl.
 *G06F 11/00* (2006.01)
(52) U.S. Cl. .................. 714/47.1; 714/11; 714/47.2
(58) Field of Classification Search .......... 714/47, 714/38, 2, 47.1, 47.2, 47.3, 4.1, 4.11, 38.1, 714/38.11, 38.12, 38.13, 38.14, 10–13; 700/20
See application file for complete search history.

(56) References Cited

U.S. PATENT DOCUMENTS

| | | | |
|---|---|---|---|
| 6,128,755 A | 10/2000 | Bello et al. | |
| 6,931,568 B2 | 8/2005 | Abbondanzio et al. | |
| 6,990,606 B2 | 1/2006 | Schroiff et al. | |
| 7,085,959 B2 | 8/2006 | Safford | |
| 7,269,764 B2* | 9/2007 | Dart et al. ....................... 714/54 |
| 7,278,055 B2 | 10/2007 | Talaugon et al. | |
| 7,340,643 B2 | 3/2008 | Grochowski et al. | |
| 2003/0188222 A1 | 10/2003 | Abbondanzio et al. | |
| 2005/0207105 A1 | 9/2005 | Davies | |
| 2005/0257213 A1* | 11/2005 | Chu et al. ........................ 717/170 |
| 2006/0010352 A1* | 1/2006 | Mukherjee et al. ............. 714/47 |
| 2006/0203715 A1 | 9/2006 | Hunter et al. | |
| 2007/0174686 A1* | 7/2007 | Douglas et al. ................. 714/13 |
| 2007/0255430 A1* | 11/2007 | Sharma et al. .................. 700/20 |
| 2008/0046774 A1 | 2/2008 | Hirai et al. | |
| 2008/0285436 A1* | 11/2008 | Robinson ...................... 370/217 |

FOREIGN PATENT DOCUMENTS

| | | |
|---|---|---|
| JP | 2007233815 | 9/2007 |
| WO | 2004021652 A3 | 3/2004 |

OTHER PUBLICATIONS

"Intel News Release: Intel Unveils Seven New Intel Itanium Processors" www.intel.com/pressroom/archive/releases/20071031comp.htm?iid=search, Oct. 31, 2007, Santa Clara, California, U.S.A.

* cited by examiner

*Primary Examiner* — Philip Guyton
*Assistant Examiner* — Joseph Kudirka
(74) *Attorney, Agent, or Firm* — Cynthia G. Seal; Law Office of Jim Boice

(57) ABSTRACT

A computer-implemented method, system and computer program product for managing failover of Management Modules (MMs) in a blade chassis are presented. Each server blade in the blade chassis evaluates a performance of a primary MM. If a threshold number of server blades determine that the primary MM is not meeting pre-determined minimum performance standards, then a secondary MM impeaches the primary MM and takes over the management of the server blades.

14 Claims, 3 Drawing Sheets

FORCED MANAGEMENT MODULE FAILOVER BY BMC IMPEACHMENT CONSENSUS

BACKGROUND OF THE INVENTION

1. Technical Field

The present disclosure relates to the field of computers, and specifically to blade servers. Still more particularly, the present disclosure relates to managing Management Modules (MMs) that support blades in a blade server chassis.

2. Description of the Related Art

While early computer architectures utilized stand-alone single computers, often referenced as Personal Computers (PCs), more powerful modern computer systems often use multiple computers that are coupled together in a common center. An exemplary common center is known as a blade center, which utilizes multiple blades that are coupled by a common backbone in a blade chassis. Each blade is a pluggable board that comprises at least one processor, on-board memory, and an Input/Output (I/O) interface. The multiple blades are capable of communicating with one another, as well as sharing common resources, such as storage devices, monitors, input devices (keyboard, mouse), etc.

Current blade chassis (also known as blade centers) provide a mechanism whereby the Management Module (MM) can failover to a redundant MM under certain conditions. There is a deficiency in the art, however, in that scenarios in which this occurs is limited. There exist times wherein a standby MM cannot determine that it needs to take over for a failed MM. For example, the standby MM could have no idea that the primary MM was too busy or is not properly servicing interrupts sent from the blade service processors.

SUMMARY OF THE INVENTION

To address the above described issue, a computer-implemented method, system and computer program product for managing failover of Management Modules (MMs) in a blade chassis are presented. Each server blade in the blade chassis evaluates a performance of a primary MM. If a threshold number of server blades determine that the primary MM is not meeting pre-determined minimum performance standards, then a secondary MM impeaches the primary MM and takes over the management of the server blades.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
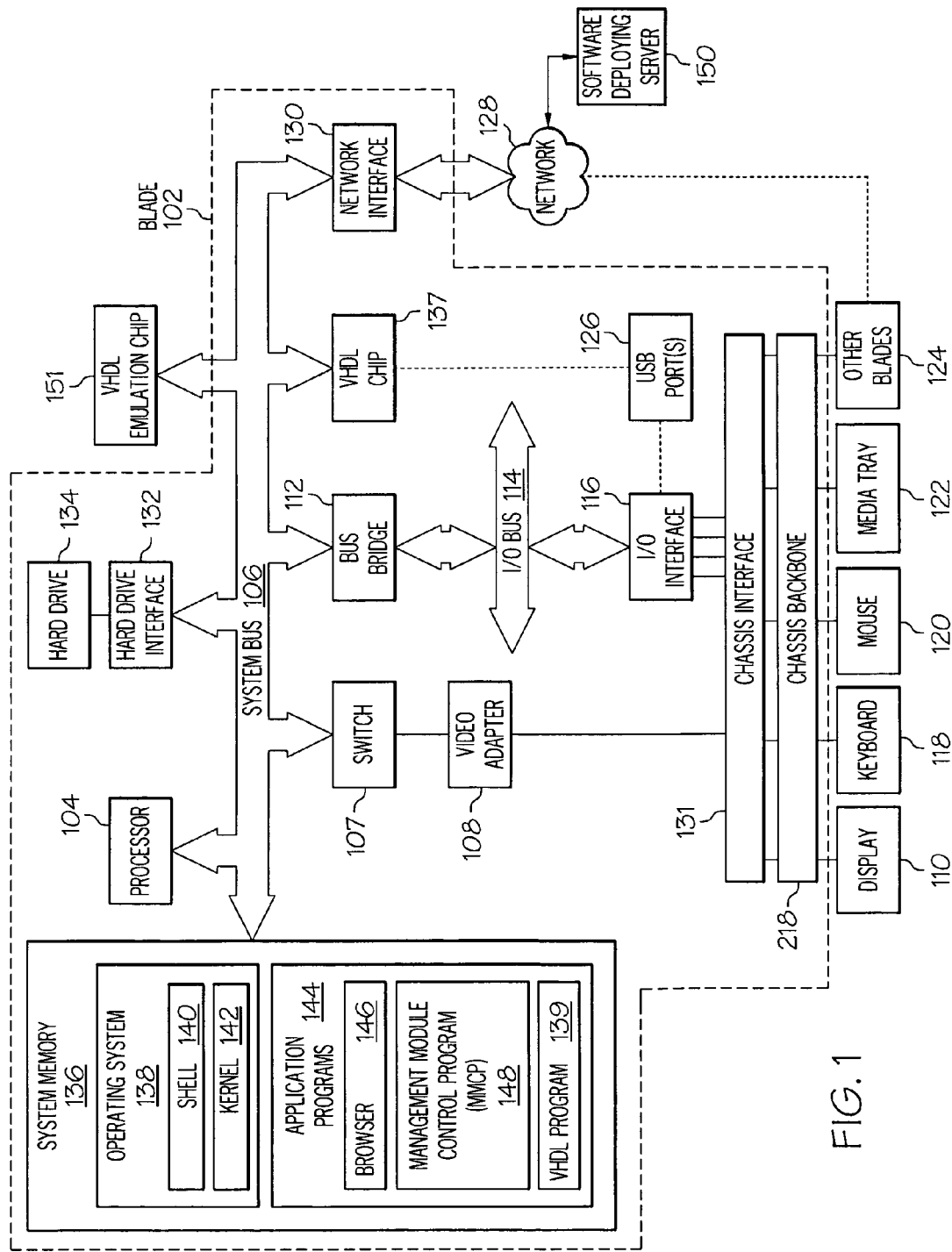
FIG. 1 depicts an exemplary server that may be utilized by the present invention.

With reference now to the figures, and in particular to FIG. 1, there is depicted a block diagram of an exemplary blade 102, which may be utilized by the present invention. Blade 102 is a component of a server blade chassis (depicted below in FIG. 2 as blade chassis 202). Blade chassis 202 is usually utilized as a server; thus, blade 102 may be referenced as a server blade. Note that some or all of the exemplary architecture shown for blade 102 may be utilized by software deploying server 150 and/or other blades 124, which may be within a same blade chassis as blade 102.

Blade 102 includes a processor unit 104 that is coupled to a system bus 106. Processor unit 104 may utilize one or more processors, each of which has one or more processor cores. A video adapter 108, which drives/supports a display 110, is also coupled to system bus 106 via a chassis interface 131 to a chassis backbone 218 (described in greater detail below). In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., Management Module Control Program—MMCP 148 described below) that perform the method described herein. This switching causes a substantive transformation of the blade 102 from a system in which pending steps and/or results of the herein described method are NOT displayed, into a system in which these results ARE displayed.

System bus 106 is coupled via a bus bridge 112 to an Input/Output (I/O) bus 114. An I/O interface 116 is coupled to I/O bus 114. I/O interface 116 affords communication with various I/O devices either directly or via the chassis interface 131, which is hardware and/or software that allows the blade 102 to be coupled to chassis backbone 218 in a blade chassis (described in further detail in FIG. 2). Once coupled to the chassis backbone 218, the blade 102 is able to communicate with other devices in addition to the display 110, including a keyboard 118, a mouse 120, a media tray 122 (which may include storage devices such as CD-ROM drives, multi-media interfaces, etc.), other blade(s) 124 that are within a blade chassis, and (if a VHDL chip 137 is not utilized in a manner described below), USB port(s) 126. Note that while other blade(s) 124 are shown as being coupled to blade 102 via the chassis interface 131, in one embodiment these other blade(s) 124 can be coupled to blade 102 via network 128, particularly if network 128 is a Local Area Network (LAN) within a blade center. While the format of the ports connected to I/O interface 116 may be any known to those skilled in the art of computer architecture, in a preferred embodiment some or all of these ports are Universal Serial Bus (USB) ports. Also coupled to I/O bus 114 is a Baseboard Management Controller (BMC) 210, which is discussed further below.

As depicted, blade 102 is able to communicate with a software deploying server 150 and, in one embodiment, with other blade(s) 124 within a blade chassis, via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in blade 102. This volatile memory includes additional higher levels of volatile memory (not shown), including, but not limited to, cache memory, registers and buffers. Data that populates system memory 136 includes blade 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., blade 102) to send and receive network messages to the Internet using HyperText Transfer Protocol (HTTP) messaging, thus enabling communication with software deploying server 150 and other described computer systems.

Application programs 144 in blade 102's system memory (as well as software deploying server 150's system memory) also include a Management Module Control Program (MMCP) 148. MMCP 148 includes code for implementing the processes described below, including those described in FIGS. 2-3. In one embodiment, blade 102 is able to download MMCP 148 from software deploying server 150, including in an on-demand basis. Note further that, in one embodiment of the present invention, software deploying server 150 performs all of the functions associated with the present invention (including execution of MMCP 148), thus freeing blade 102 from having to use its own internal computing resources to execute MMCP 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from MMCP 148 causes VHDL program 139 to configure VHDL chip 137, which may be an FPGA, ASIC, etc. This programming of VHDL chip 137 causes a substantial transformation of the architecture of blade 102, wherein (assuming that USB port (s) 126 are NOT coupled to I/O interface 116) USB port(s) 126 are now selectively coupled to system bus 106 via VHDL chip 137.

In another embodiment of the present invention, execution of instructions from MMCP 148 results in a utilization of VHDL program 139 to program a VHDL emulation chip 151. VHDL emulation chip 151 may incorporate a similar architecture as described above for VHDL chip 137. Once MMCP 148 and VHDL program 139 program VHDL emulation chip 151, VHDL emulation chip 151 performs, as hardware, some or all functions described by one or more executions of some or all of the instructions found in MMCP 148. That is, the VHDL emulation chip 151 is a hardware emulation of some or all of the software instructions found in MMCP 148. In one embodiment, VHDL emulation chip 151 is a Programmable Read Only Memory (PROM) that, once burned in accordance with instructions from MMCP 148 and VHDL program 139, is permanently transformed into a new circuitry that performs the functions of elements 204, 206, and/or 212 shown below in FIG. 2. Thus, VHDL emulation chip 151 is also properly viewed as a machine that is under the control of blade 102. Note that while VHDL emulation chip 151 is depicted as being a different entity that is separate from blade 102, in another embodiment VHDL emulation chip 151 may be an integral part of blade 102.

The hardware elements depicted in blade 102 are not intended to be exhaustive, but rather are representative to highlight essential components required by the present invention. For instance, blade 102 may include alternate memory storage devices such as magnetic cassettes, Digital Versatile Disks (DVDs), Bernoulli cartridges, and the like. These and other variations are intended to be within the spirit and scope of the present invention.

Figure 2:
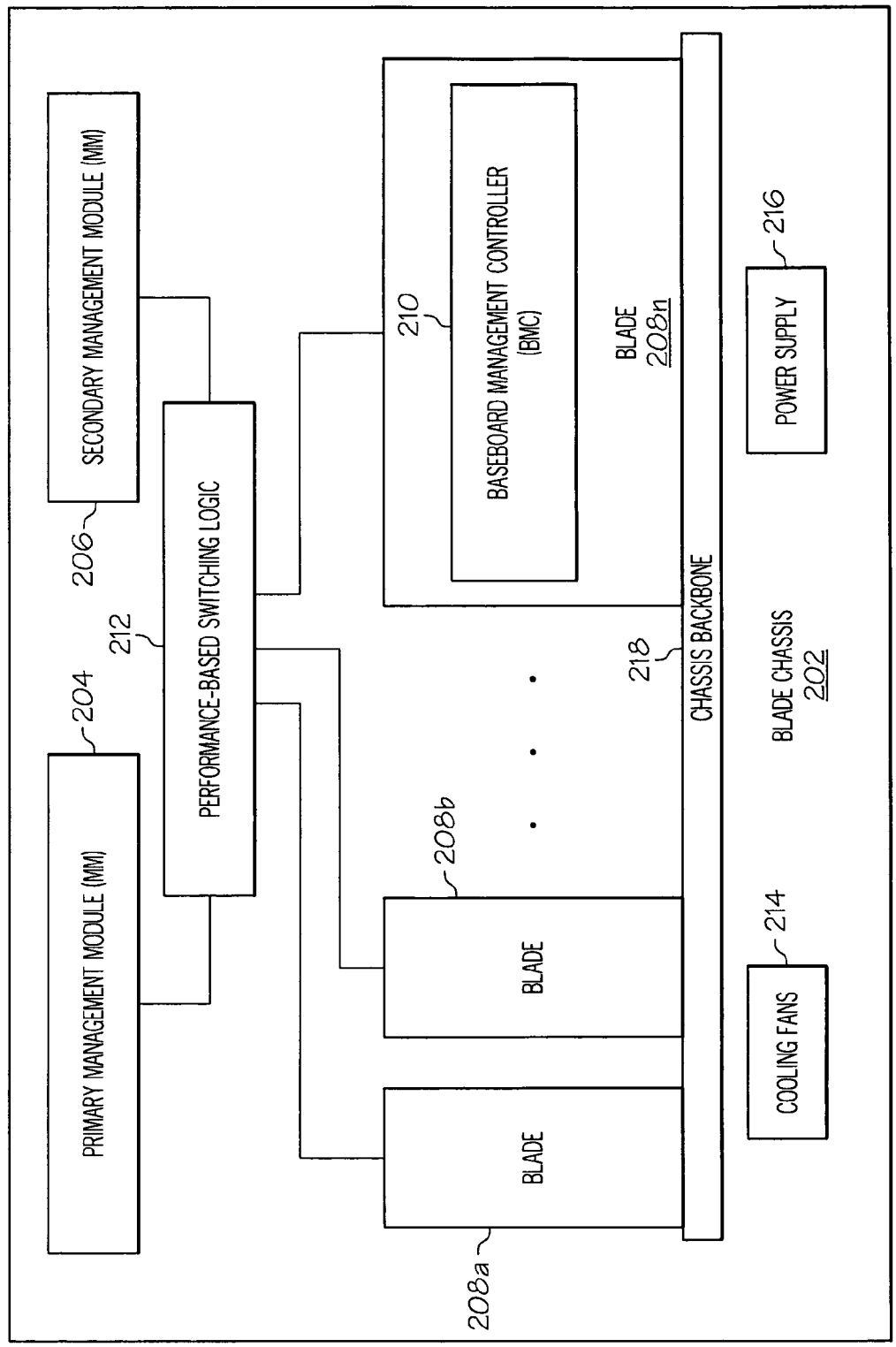
FIG. 2 illustrates a unique and novel blade chassis having a failover secondary management module that is enabled by votes from blades in the blade chassis.

Referring now to FIG. 2, an exemplary blade chassis 202, in which the present invention may be implemented, is presented. Within blade chassis 202 are a plurality of blades 208a-n, where "n" is any integer, but is preferably 14. The blades 208a-n (each referenced individually as a set/subset without specificity as 208) are coupled to a chassis backbone 218, which provides mechanical and logical connections (e.g., data and control signal interchange) among the blades 208a-n. Associated with, and preferably mounted on each blade 208, is a separate Baseboard Management Controller (BMC) 210. That is, in a preferred embodiment, each blade 208 has its own unique BMC 210. In an alternate embodiment, multiple blades 208 may share a same BMC 210. In either architecture, BMC 210 is a specialized microcontroller that monitors the overall health and environment of a blade 208. This monitoring includes, but is not limited to, controlling cooling fans 214, adjusting power supply 216 for one or more blades 208, checking on an Operating Status (OS) within a particular blade 208, and then sending warning and alerts regarding anomalies to such monitored activities to an administrator (not shown). In accordance with the present invention, the BMC 210 also monitors a performance of a primary Management Module (MM) 204, to which a particular blade 208 (e.g., blade 208n) is presently coupled.

Primary MM 204 (and likewise secondary MM 206) includes a processor (not shown) for controlling Input/Output (I/O) functions of specific blades 208, interfacing a specific blade with a network (e.g., network 128 shown in FIG. 1), and allocating jobs and data to specific blades 208.

As stated earlier, BMC 210 is able to monitor the activities of primary MM 204, particularly as those activities directly relate to a specific blade 208, such as the exemplary blade 208n depicted in FIG. 2. A pre-determined threshold for activity performance levels may be set, such that if the BMC 210 determines that these thresholds are not being met, specific actions can be taken. In the present invention, these specific actions include sending a message to the secondary MM 206, letting the secondary MM 206 know that the primary MM 204 is not performing up to required levels. The secondary MM 206 can then tally such messages from different BMCs 210 on other blades 208, in order to decide if the primary MM 204 needs to be impeached (disconnected by the performance-based switching logic 212) and replaced by the secondary MM 206. In an alternate embodiment, the potential of a "rogue" secondary MM 206 overthrowing the primary MM 204 can be reduced by assigning the authority and responsibility of impeaching the primary MM 204 to the performance-based switching logic 212, which may include processing logic (not shown) for performing this task. For example, the secondary MM 206 may be defective (e.g., from a virus, a mechanical failure, etc.), leading it to overthrow the primary MM 204, for no reason. Allowing the performance-based switching logic 212 to control failover avoids, or at least minimizes, this problem.

Note that in a preferred embodiment, each of the blades 208a-n has its own unique BMC 210. Alternatively, multiple blades 208 may share a single BMC 210. Note also that components within blade chassis (e.g., blades 208a, baseboard management controller 210, performance-based switching logic 212, and primary/secondary management modules 204 and 206) may be coupled together by a RS485 communication path (not shown). Before failover, secondary MM 206 has an active network connection to an internal (secondary) network (also not shown), but has no access to the RS485 communication path until the secondary MM 206 takes over as the primary MM. Service processor alerts may be sent using the RS485 network to the primary MM, which may be either the primary MM 204 or the secondary MM 206 (after the secondary MM 206 is failed-over to).

Figure 3:
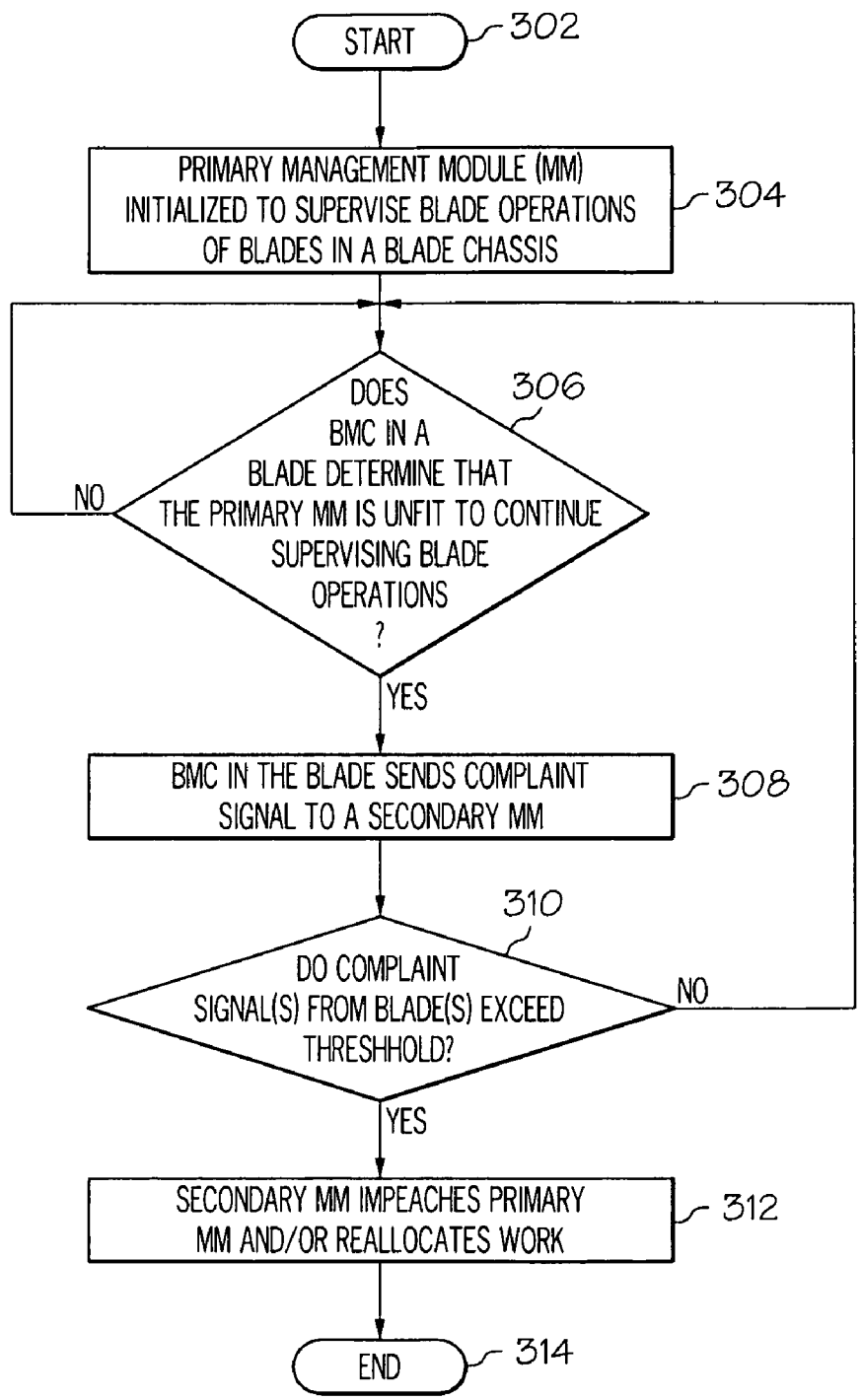
FIG. 3 is a flow-chart of exemplary steps taken to manage the failover of management modules in blade chassis.

With reference now to FIG. 3, a high level flow-chart of exemplary steps taken to manage the failover of management modules in a blade chassis is presented. After initiator block 302, a primary Management Module (MM) is initialized to supervise server blade operations in one or more server blades in a blade chassis (block 304). This initialization includes the physical and logical coupling (e.g., via an RS485 network and a backbone) of the server blades to the primary MM. In a preferred embodiment, this coupling is via a performance-based switching logic that selectively couples one or more of the server blades to either a primary MM or a secondary MM. In one embodiment, this selective coupling is under the direction and management of the secondary MM in a manner described below.

As described in query block 306, a Baseboard Management Controller (BMC) in each of the server blades determines whether the primary MM is meeting pre-determined minimum performance requirements. These pre-determined minimum performance standards may be based on how rapidly and/or efficiently and/or correctly the primary MM distributes work among the server blades or to a specific server blade, how long it takes the primary MM to respond to a request from a server blade for service (e.g., providing an interface and connection to another server blade or a network, timely providing data and/or instructions to a requesting server blade, etc.), etc. The BMC's evaluation may result in a score that indicates how well the primary MM is performing, including whether the primary MM has failed to meet a set of cumulative pre-determined minimum performance requirements. A tally of different minimum performance standards for different services provided by the primary MM can then be used to assign a pass/fail rating for the primary MM, as judged by a particular BMC/blade.

If the BMC determines that the primary MM is not meeting the pre-determined minimum performance requirements (again query block 306), then the BMC from a particular server blade sends a complaint signal to the secondary MM (block 308). This complaint may have the authority to force the secondary MM to instruct a performance-based switching logic to decouple the primary MM and to failover to the secondary MM. In a preferred embodiment, however, this complaint signal is merely a "vote," which is added to other votes from other BMCs in other server blades. If the weight of the vote(s) is sufficient (query block 310), then the secondary MM determines that a failover threshold has been reached, and the secondary MM instructs the performance-based switching logic to decouple the primary MM and to failover to the secondary MM (i.e., couple the secondary MM to the server blades). Note that this failover may cause all of the server blades to now be coupled to the secondary MM, or alternatively, may cause only some of the server blades to be coupled to the secondary MM while other server blades remain coupled to the primary MM. The decision as to which (or all) of the server blades are coupled to one or the other MM may be based on the secondary MM's evaluation of the performance of the primary MM (based on the complaint signals and/or votes from the BMCs) and the capacity and capabilities of the secondary MM (of which the secondary MM is self-aware). Note that the votes and complaint signals may be a same signal, or preferably, are different messages. That is, in a preferred embodiment, a vote is merely a "go/no go" message to the secondary MM to impeach/evict/failover the primary MM, while the complaint signal is a finer-grained message that describes in more detail what deficiencies in the primary MM are being perceived by a particular BMC in a particular server blade. Note also that the complaint signal may be integral to a primary MM performance score set by the BMC. Thus, the BMC can dynamically and autonomously adjust what this score should be in order to be "acceptable." That is, the BMC can dynamically adjust its benchmarks for the primary MM such that a vote and/or complaint signal may be dependent on environmental issues (e.g., how much total traffic from all server blades is being handled by the primary MM), time of day (e.g., a BMC may be more lenient in its grading during the historically busy middle of a day compared to a historically slower middle of the night), etc. The BMC is therefore able to dynamically adjust its criteria for whether the primary MM should be impeached. This is accomplished by adjustment logic (i.e., a processor) within the BMC.

Returning to query block 310, if complaint signals and/or votes from one or more BMCs exceed the minimum combined performance requirement that is required of the primary MM, then the secondary MM stages a coup (block 312), in which the primary MM is ousted, and the secondary MM takes over the MM role for the complaining server blades. Note again that this reallocation is preferably an "all-or-none" scenario, in which the secondary MM takes over all of the duties of the primary MM, and thus supervises all of the server blades in the blade chassis. Alternatively, the failover may be a partial failover, in which the primary and secondary MM share management responsibilities for the server chassis. Note also that once the failover occurs, the primary MM may now become the backup (secondary) MM for failover purposes.

Note also, as described in block 312, that work can be reallocated if there is a failover or a failed failover attempt. That is, if there are enough complaint signals and/or impeachment votes from the BMCs, then the secondary MM may decide that it is unable, even with the primary MM's help, to handle all of the demands of the server blades and their BMCs. In this scenario, the secondary MM will call another server chassis, and will transfer some or all of the currently pending jobs in the local server chassis to the other server chassis. The process ends at terminator block 314.

As described in one embodiment herein, the present invention uses an internal network as a communication path for the blade service processors to complain about (vote to impeach)

the primary MM. These votes are targeted at the standby (secondary) MM, which collects the votes and performs periodic tallies of the votes to determine if an impeachment (failover) is required. Once a configurable threshold of votes is collected, then the standby MM resets the primary MM and takes over as primary. The previously primary MM then goes into a standby mode and the service processors are updated with the new MM (primary and standby) IP information and the voting process begins again.

As described above, in one scenario a Management Module is flooded with tasks and is not adequately handling critical requests from BMCs onboard the individual blades. The management module may be unaware that it is dropping packets or failing, because it is busy or broken. BMCs in one or more server blades are empowered to raise a signal to indicate that the BMC(s) believe that the current Management Module is unfit to continue its duties and request a failover. BMCs raise this signal according to a configured or hard-coded (pre-determined) failover policy. The redundant (backup/secondary) management module is implemented to receive, or monitor for, these signals from the various BMCs in the system. If a threshold number of BMCs have raised a signal that they are in favor of a failover, the redundant management module is empowered to assume primary management device responsibility and notify all BMCs that this failover has occurred, whereupon all BMCs may lower their overthrow signals and continue normal operation. Once a BMC raises its overthrow signal, it can lower the threshold for such a signal on its own before a failover takes place, thus affording time for an improvement in behavior by the management module to be observed (i.e. give the primary MM a "second chance"). In one embodiment, a primary management module, upon seeing overthrow flags raised, takes actions to attempt to improve its quality of service, and/or to send a predictive failure/failover alert to an administrator.

In another embodiment, the BMCs agree that a failover of a more significant magnitude needs to occur. For example, if the Heating Ventilation Air Conditioning (HVAC) systems in a server room give out, thereby frying the management modules, the BMCs are enabled to signal for a datacenter-level failover, which enables an administrator of some other agent to shift the datacenter workload to another site in absence of a Management Module initiated directive.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, when is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing a additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A server blade chassis comprising:
a primary Management Module (MM) and a secondary MM, wherein the primary MM and the secondary MM allocate jobs to specific server blades;
a performance-based switching logic that selectively couples the primary MM and the secondary MM to each of a plurality of server blades; and
a separate Baseboard Management Controller (BMC) associated with said each of the plurality of server blades, wherein the plurality of server blades are initially coupled to and managed by the primary MM, and wherein each said BMC determines whether the primary MM is meeting a pre-determined minimum performance requirement, and wherein, in response to one or more determining that the primary MM is not meeting, the pre-determined minimum performance requirement, one of said BMCs instructs the performance-based switching logic to decouple the primary MM and to couple the secondary MM to the server blades, and wherein, in response to one or more BMCs determining that the secondary MM is unable to meet the pre-determined minimum performance requirement, one or more of said BMCs initiates a partial failover in which the primary MM and the secondary MM share management responsibilities over the server blades.

2. The server blade chassis of claim 1, wherein a failing primary MM performance score is derived by multiple different BMCs in the server blades.

3. The server blade chassis of claim 2, wherein the secondary MM tallies failing primary MM performance scores to reach a failover threshold, and wherein the failover threshold causes the secondary MM to instruct the performance-based switching logic to decouple the server blades from the primary MM and to couple the server blades to the secondary MM.

4. The server blade chassis of claim 1, wherein a primary MM performance score is transmitted to the performance-based switching logic in response to a failing grade for the primary MM performance score being derived by a particular BMC, the server blade chassis further comprising:
an adjustment logic within the particular BMC, wherein the adjustment logic allows the BMC to dynamically adjust the failing grade for the primary MM performance score, and wherein an adjusted failing grade prevents a message from being sent to the performance-based switching logic to decouple the primary MM.

5. A computer-implemented method comprising:
physically coupling a plurality of server blades in a blade chassis to a performance-based switching logic, wherein the performance-based switching logic selectively couples one or more of the server blades to either a primary Management Module (MM) or a secondary MM;
determining, by a Baseboard Management Controller (BMC) within at least one of the server blades, whether the primary MM is meeting pre-determined minimum performance requirements;
in response to one or more BMCs determining that the primary MM is not meeting the pre-determined minimum performance requirements, instructing the performance-based switching logic to decouple the primary MM and to couple the secondary MM to the server blades; and
in response to determining that the secondary MM is unable to meet the pre-determined minimum performance requirements, initiating a partial failover in which the primary MM and the secondary MM share management responsibilities over the server blades.

6. The computer-implemented method of claim 5, wherein the secondary MM tallies failing primary MM performance scores to reach a failover threshold, and wherein the failover threshold causes the secondary MM to instruct the performance-based switching logic to decouple the server blades from the primary MM and to couple the server blades to the secondary MM.

7. The computer-implemented method of claim 5, further comprising:
dynamically adjusting a failing grade for a primary MM performance score, wherein an adjusted failing grade prevents a message being sent to the performance-based switching logic to decouple the primary MM.

8. The computer-implemented method of claim 5, further comprising:
in response to the secondary MM being unable to meet the pre-determined minimum performance requirements, re-allocating all operations being executed within the blade chassis to another blade chassis with other server blades.

9. The computer-implemented method of claim 5, wherein the primary MM controls Input/Output (I/O) functions of the server blades, job and data allocation to the server blades, and network interfacing between a network and the server blades.

10. A computer-implemented method comprising:
physically coupling a plurality of server blades in a blade chassis to a performance-based switching logic, wherein the performance-based switching logic selectively couples one or more of the server blades to either a primary Management Module (MM) or a secondary MM;
determining, by a Baseboard Management Controller (BMC) within at least one of the server blades, whether the primary MM is meeting pre-determined minimum performance requirements;
in response to one or more BMCs determining that the primary MM is not meeting the pre-determined minimum performance requirements, instructing the performance-based switching logic to decouple the primary MM and to couple the secondary MM to the server blades; and
in response to determining that an environmental condition will cause damage to the primary MM and the secondary MM, multiple BMCs initiating a datacenter-level failover in which a workload scheduled for execution on the server blades is shifted to another site in which the environmental condition does not exist.

11. The computer implemented method of claim 10, wherein the secondary MM tallies failing primary MM performance scores to reach a failover threshold, and wherein the failover threshold causes the secondary MM to instruct the performance-based switching logic to decouple the server blades from the primary MM and to couple the server blades to the secondary MM.

12. The computer implemented method of claim 10, further comprising:
dynamically adjusting a failing grade for a primary MM performance score, wherein an adjusted failing grade prevents a message being sent to the performance-based switching logic to decouple the primary MM.

13. The computer implemented method of claim 10, further comprising:
in response to the secondary MM being unable to meet the pre-determined minimum performance requirements, re-allocating all operations being executed within the blade chassis to another blade chassis with other server blades.

14. The computer implemented method of claim 10, wherein the primary MM controls Input/Output (I/O) functions of the server blades, job and data allocation to the server blades, and network interfacing between a network and the server blades.

* * * * *